Oct. 27, 1942.　　　G. E. SAUSSURE　　　2,300,014
LIQUID FILTER
Filed July 24, 1939　　　2 Sheets-Sheet 1
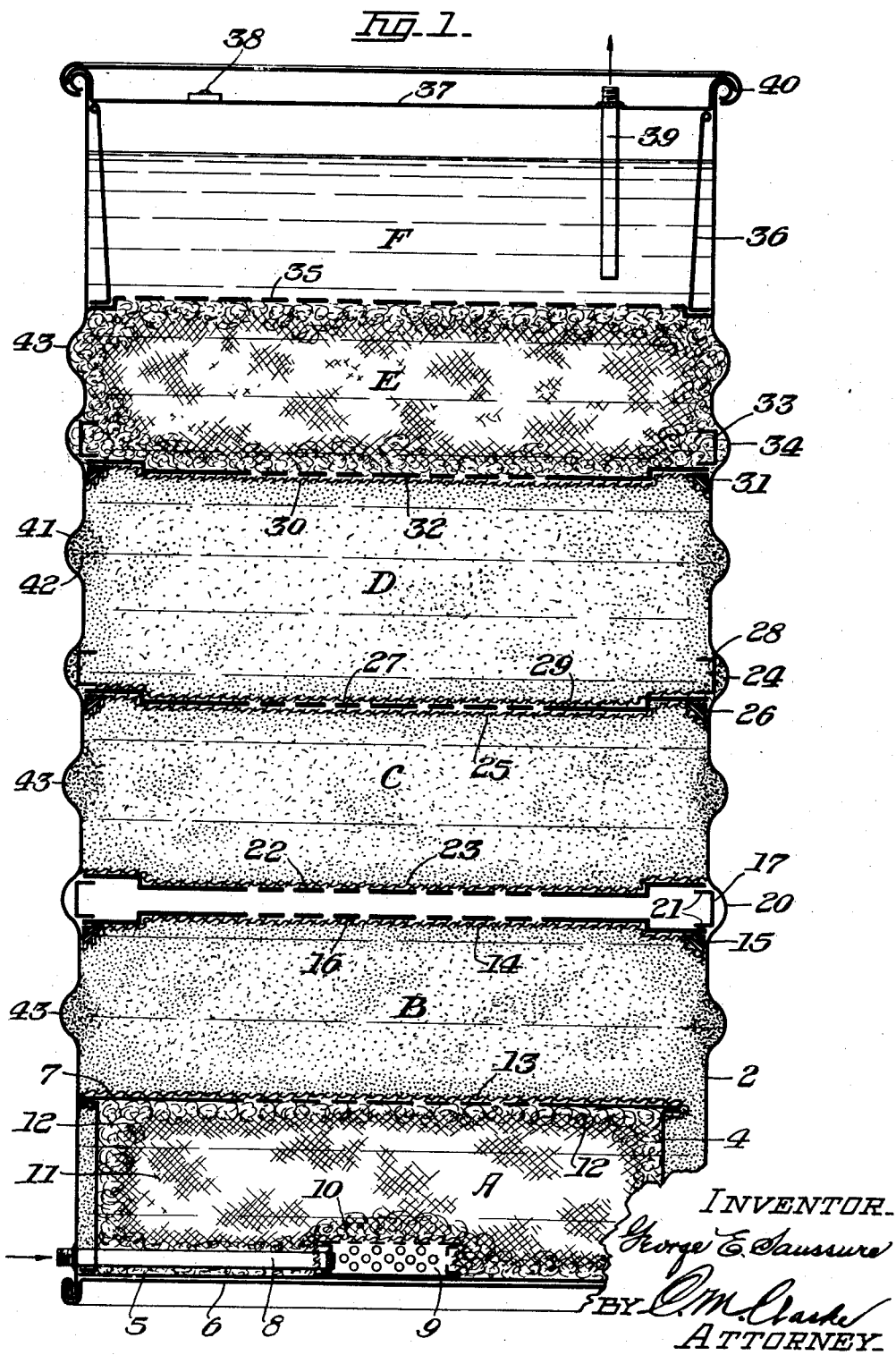
INVENTOR.
George E. Saussure
BY C. M. Clarke
ATTORNEY.

Oct. 27, 1942.   G. E. SAUSSURE   2,300,014
LIQUID FILTER
Filed July 24, 1939   2 Sheets-Sheet 2
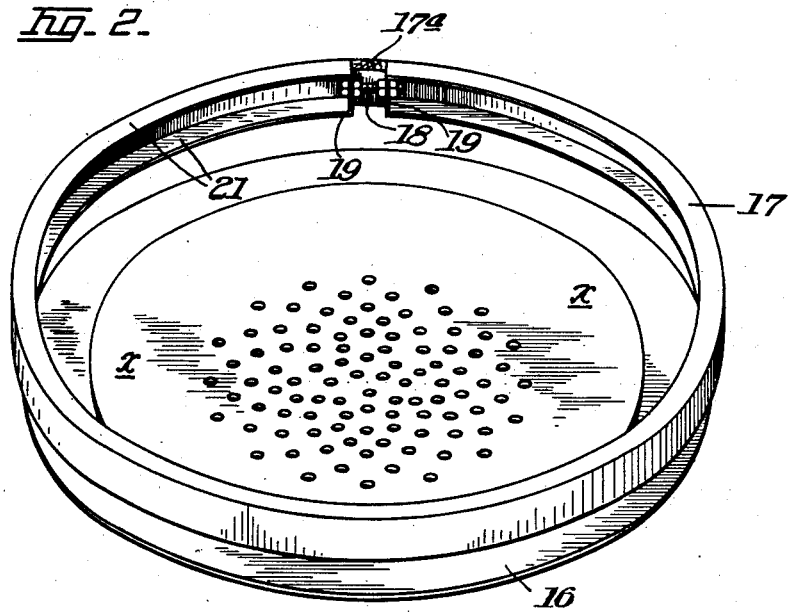
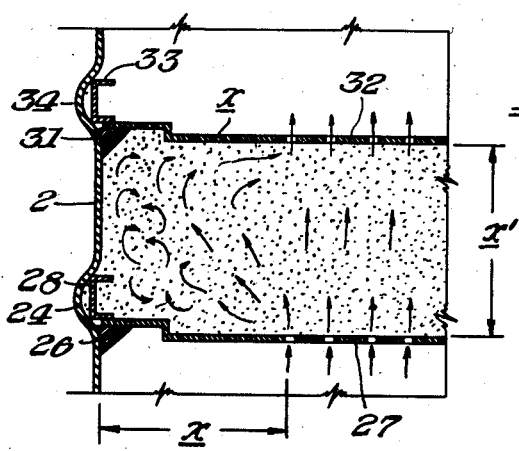
INVENTOR.
George E. Saussure
BY O. M. Clarke
ATTORNEY.

Patented Oct. 27, 1942

2,300,014

UNITED STATES PATENT OFFICE 2,300,014

LIQUID FILTER

George E. Saussure, Pittsburgh, Pa.

Application July 24, 1939, Serial No. 286,135

6 Claims. (Cl. 210—134)

This invention relates to improvements in liquid filters, and more particularly to pressure filters of the character wherein a filtering flow of liquid takes place under an applied pressure.

In the purification of oils, such as lubricating or flushing oils and the like, comminuted or granular mineral substances, such as fuller's earth, are known to have the ability to remove impurities such as suspended solids and certain acids from the dirty oil.

When employing such a substance as a filtering medium, it is necessary that it be confined in a receptacle, as for example, a cylindrical or other container, and the liquid is passed therethrough, either by gravity or by means of an applied pressure.

While prior filters of fuller's earth are generally successful and efficient when employed with a slow gravity flow of liquid therethrough, their efficiency generally decreases with an increase in the pressure application of the liquid thereto.

The principal reason for such decreased efficiency is the tendency of the liquid to channel through and by-pass the filtering material without receiving proper filtration.

The aforesaid tendency presents considerable difficulty in the construction and operation of commercial filters, wherein it is desired to provide substantial capacity and speed of filtration, necessitating the operation of these filters under pressure.

For example, in internal motor cleaning apparatus, the flushing oil is drawn from a crank case and delivered to a filter under pressure up to substantially 50 pounds per square inch, and from 30 to 50 quarts of oil are used for each cleaning operation.

Accordingly, it is a prime object of my invention to provide a pressure filter employing a comminuted material such as fuller's earth or the like, wherein the flow of liquid through the said material is controlled so as to prevent channelling through and by-passing the fuller's earth.

The invention contemplates controlling the flow area to the filtering material in relation to the bed thereof, whereby the filtering passage of liquid is restricted to the central portion of the bed.

Also, where it is necessary to employ a substantial depth of fuller's earth or the like, the invention contemplates relieving the bed throughout and particularly at the lowermost portion thereof, as by zone segregation of portions of the depth, to prevent packing and compression of the said material.

My invention also has in view the use of a pre-filter for removing foreign matter, and for the reduction of pressure and the velocity of flow in a filter of the character stated.

Additional objects and advantages will become apparent from the following description taken in connection with the accompanying drawings, wherein:

Fig. 1 is a vertical sectional view through a liquid filter embodying my invention;

Fig. 2 is a perspective view showing a filter plate and its retaining ring; and

Fig. 3 is a detail section like Fig. 1, illustrating a single filter bed or layer and the liquid flow therethrough.

Referring to the drawings, 2 designates a cylindrical drum or filter case for receiving and containing the filtering materials. For clarity, the parts of the filter will be described herein in the order of assembling and packing the filter.

At the bottom end of the case 2 is provided a pre-filter, generally designated A, and which preferably includes a cylindrical casing 4 having a bottom 5 resting on the bottom head 6 of the main case 2. 7 designates the top or head of the pre-filter, in the form of a perforated transverse plate.

A liquid inlet pipe 8 extends through the wall of the main case 2 and the pre-filter, terminating in a flat cylindrical sludge trap 9 centrally positioned upon the bottom 5 of the pre-filter.

The side wall and top of the trap 9 are perforated as shown, for delivery of the incoming liquid from pipe 8 to the pre-filter. A fabric cover 10, such as burlap, preferably covers the trap 9 to screen the liquid discharging into the pre-filter.

Pre-filter A may be packed before mounting in the main case 2, and preferably includes a bed of fine fibrous material 11, such as fiber glass or the like, enclosed at the top and sides by a layer of cotton waste 12. Said fiber glass and waste is packed with sufficient tightness to effectively remove the bulky foreign matter not separated by the trap 9.

A fabric layer 13, such as burlap, preferably covers the perforations in the top 7 of the pre-filter.

Above the pre-filter A, I provide a column of a comminuted or granular mineral substance such as fuller's earth of the desired over-all height or depth to effect a proper clarification of the liquid being treated. However, I prefer to segregate the total column into a series of beds or filter layers for reasons hereinafter more fully described.

Beginning with the lowermost bed or layer B, the bed of fuller's earth is poured into the case 2, completely surrounding and covering the pre-filter A as shown, and continues to the desired depth i. e. approximately one-third of the total height of the entire column of fuller's earth. A fabric or burlap 14 is preferably laid over the top of the layer or bed B, the peripheral edge of said burlap being engaged by an annular packing or a ring gasket 15 having sealing engagement with the inner surface of the case 2.

A flat perforate plate 16 is next laid over the burlap 14 and peripherally engages the gasket 15.

For the purpose of securing said plate against upward movement, I provide a retaining member 17 in the form of a channel-shaped split ring, having its free ends connected by a bolt 18 having nuts thereon engaging flanges 19 of the ring ends for expanding said ring into a provided hollow hoop or annular recess 20 of the case, said recess being positioned at the proper height in relation to the bed portion B of fuller's earth, to permit the engagement of ring and plate as shown in Fig. 1.

Hence, the ring 17 is expanded outwardly into recess 20 and tightly secured therein with its parallel flanges 21 projecting into the case 2, the lower flange engaging the plate 16 and retaining the same against upward movement. A member such as a block of wood 17a may be driven between the ends of the expanded ring for closing the gap therein and serving to lock the ring in expanded position.

A second perforated plate 22 is laid on the upper flange 21 of the ring 17 in spaced relation to plate 16, a layer of burlap 23 is placed thereover, and a second bed or layer C of fuller's earth is then poured thereon approximately to the height of an annular recess 24.

A burlap 25 and a ring gasket 26 are next laid over the upper surface of layer C, and a perforated plate 27 is applied and secured as before by engagement by a retaining ring 28 expanded into recess 24 as before described.

Another piece of burlap 29 is preferably applied over plate 27, and a third bed or layer D of fuller's earth applied, being secured with covering burlap 30, gasket 31, and perforate plate 32, by a split ring 33 expanded into annular recess 34 in the case 2, as before.

Above the composite column B—C—D of fuller's earth, is applied a final filter portion E of cotton waste and fiber glass, topped with a perforated plate 35 held in position by a cylindrical spacer 36 engaged by the cover 37 of the case 2. The spacer 36 defines a reservoir F in the upper end of the filter case 2 between said cover 37 and the uppermost portion of the filter bed, for receiving and containing the filtered liquid as indicated.

A pressure relief or air valve 38 is provided in the cover 37, said cover also mounting a liquid discharge pipe 39 which depends into the reservoir F for withdrawal of clean liquid. 40 designates a sealing ring of well known form for securing the cover 37 to the upper end of the case 2.

After the filter is assembled and packed in this manner, the liquid to be filtered is supplied thereto under pressure, through inlet pipe 8 at the lower end of said filter. The liquid, such as oil or the like, flows into and upwardly through the filtering material to the reservoir F.

As in the use of such a filter in an internal motor cleaning apparatus, the filter is generally filled with flushing oil which is drawn off from the reservoir, and returned to the pipe 8 by means of a pump, the latter serving to maintain the oil in the filter while the apparatus is inactive.

As the dirty oil enters the filter, the heavy sludge, etc., is removed or separated therefrom by the trap 9, and the remaining bulky foreign material being removed from the oil during passage through the fibrous bed of the pre-filter A.

The pre-filter has a two-fold purpose. In addition to removing the foreign matter as stated, the pre-filter also acts as a pressure and velocity damper. The liquid enters the pre-filter at relatively high pressure and velocity, as from a pump, and by discharging into the separate casing 4 and in passing through the fine fibrous material, suffers a drop in pressure and velocity whereby the same may be controlled to satisfactory amounts for entrance to the multiple column of fuller's earth.

As the oil or other liquid rises in the filter case 2 under an applied pressure, the passage thereof through the fuller's earth is separately controlled at each bed or portion B, C and D in such a manner as to prevent channelling through the fuller's earth, particularly at the outer region along the wall of the case 2. In this respect, the top or head 7 of the pre-filter and transverse plates 16, 22 and 27 serve as control members by their restriction upon the delivery of liquid therethrough to the respective layers B, C and D.

Thus, each of said members 7, 16, 22 and 27 are perforated at their central portions only, providing outer surrounding impervious ring baffle portions $x$ of substantial width, whereby the flow through each of said control members to the bed of fuller's earth immediately thereabove is restricted to the central portion of that bed.

In its normal operation, the entire filter becomes filled with liquid, and the liquid flow entering a filter bed B, C or D under pressure will flow upwardly and outwardly through the fuller's earth.

Due to the flow being centrally confined as it enters a bed, those regions of each filter bed above the baffle portions $x$ of the control members will be resistant to an outward flow of liquid, due to the generation of eddy currents therein as indicated in Fig. 3, whereby the tendency of the flow toward the wall of the case 2 is relieved and delayed until the flow proper has reached a substantial elevation above a baffle portion.

From observation and tests, I have concluded that the pressure flow through a bed of fuller's earth in a filter of the general character herein set forth, appears to progress upwardly and outwardly at a substantially equal rate of flow, whereby the rising liquid will spread out to the wall of the case 2 at an elevation $x'$ above a control member substantially equal to the width of the baffle portion $x$, or the distance from the outer perforations or limit of flow through the control member to said wall.

In other words, the outward flow which tends to channel through the fuller's earth along the wall of the case 2 may be adequately controlled by centrally disposing the flow entering a bed of the said material. Hence, the most advantageous construction resides in providing the depth of the bed of fuller's earth between control members substantially equal to the width of the baffle portion $x$.

Since the region where channelling would take place if permitted is determined, I am enabled to provide against the same by a properly positioned seal. Thus in the present construction, the gaskets 15, 26 and 31 with associated retaining plates 16, 27 and 32, provide proper seals at the wall of case 2, the flow being deflected inwardly beneath any of said plates and therethrough to the next filter bed thereabove.

It will be apparent to those skilled in the art, that it may be necessary to vary the theoretical proportions above discussed in order to provide increased clarification, as by slightly increasing the depth of one or more of the beds of fuller's earth, while at the same time maintaining the original flow area through the control plates. Such an increased depth is illustrated in the uppermost bed D of the drawings.

In such case, additional means may be provided at the region of expected channelling to deflect the outward flow of liquid and thereby prevent the channelling action thereof along the wall of the case 2.

I have found that the provision of an annular recess or hoop 41 at such an elevation in the wall of the case will also effectively resist such channelling. The fuller's earth being abrasive in character will not flow as readily as the liquid, and will pack into the recess 41 as indicated at 42 in Fig. 1, providing a barrier to outward flow of liquid to the wall of the case, whereby the liquid will be deflected and will pass upward to the gasket 31.

Such annular recesses are also advantageous for securing the beds or layers of fuller's earth against undue movement and packing. I prefer to employ several of such recesses throughout the filter for such purpose, as indicated at 43.

A further advantage is obtained by the plates 16, 22, 27 and 32 in preventing an accumulated packing or compressing by the several beds or layers of the column of filtering material. Due to their respective retaining rings, the plates 16, 27 and 32 prevent the upward packing of the filtering column by confining any such tendency to the individual beds or layers.

Also, for the protection of the initial bed or layer B of fuller's earth, the plate 22 relieves said bed of the weight of the upper layers C, D and E, the said weight being supported by the retaining ring 17 and the filter case 2.

Various changes and modifications are contemplated within the scope of the following claims.

What I claim is:

1. A filter having a case provided with an inlet and an outlet, a column of comminuted filtering material in said case between said inlet and outlet in the path of liquid flow, plates disposed transverse to the path of liquid flow separating said column into a plurality of layers, said plates having central perforate portions and outer impervious portions controlling liquid flow centrally of the layers, sealing means engaging the plates marginally and the wall of the case at the flow side of the plates, interior annular recesses in the wall of the case, relatively stationary rings in the recesses forming transverse abutments for contact by the plates to prevent movement thereof in the direction of flow of said liquid, and another plate like those first mentioned opposite to one of the latter plates and separated therefrom by the ring engaged thereby to provide a space intermediate the ends of the column.

2. A filter having a case provided with an inlet and an outlet, filtering material in the case between said inlet and outlet, a plate disposed transverse to said material and supporting the same, abutment means within the case engaged by the plate on the same side as the filtering material, and a gasket engaging the inner wall of the case and on which the plate rests at the opopsite side of the abutment means, said plate having an approximately central perforate portion and an impervious portion extending from said portion to the gasket.

3. In a filter, a cylindrical filter case having an inlet and an outlet, a column of comminuted filtering material in said case between the inlet and outlet, plates disposed transverse to the path of liquid flow separating said column into a plurality of layers and constraining liquid flow to a path centrally of said layers, interior annular recesses in the wall of the case, relatively stationary rings in said recesses forming transverse abutments for engagement by the plates and resisting movement of the plates longitudinally of the case and in the direction of liquid flow, sealing means surrounding the inner surface of the case and the sides of the respective plates opposite to the rings, and another plate opposite to one of the first mentioned plates and separated from the latter by the adjacent ring to provide a space intermediate the ends of the column.

4. In a filter of the character described, a case having an inlet and an outlet, an interior recess in the wall of the case, a bed of comminuted filtering material in the path of liquid flow, a circulation control member in the path of liquid flow having a central perforate portion and an outer impervious portion, a ring removably disposed in said recess abutted by the outlet side of said member, and a gasket engaging said wall and on which said member rests at its other side.

5. In a filter of the character described, a case having an inlet and an outlet, a bed of filtering material in the path of liquid flow, a circulation control plate below said bed in the path of liquid flow having a central perforate portion and an outer impervious portion, abutment means interiorly of the case interengaged with the wall of the case, said means being abutted by the outlet side of said plate, and a gasket means within the case engaging said wall and on which said plate at its other side rests.

6. In a filter of the character described, a case having an inlet and an outlet, a bed of filtering material in the path of liquid flow, a circulation control member in said path having a central perforate portion and an outer impervious portion, contractile abutment means interiorly of the case interengaged with the wall of the case, a gasket means within the case, and said member being contacted on opposite sides by said abutment means and gasket means.

GEORGE E. SAUSSURE.